United States Patent
Kameoka et al.

[11] Patent Number: 5,936,321
[45] Date of Patent: Aug. 10, 1999

[54] MAGNET COUPLING INCLUDING PERMANENT MAGNETS DISPOSED TO DEFINE MAGNETIC GAP THEREBETWEEN

[75] Inventors: Teruhiko Kameoka, Okazaki; Kazutoshi Kuwayama, Nakashima-gun; Hikaru Sugi, Nagoya, all of Japan

[73] Assignee: Denso Corporation, Kariya, Japan

[21] Appl. No.: 09/087,812

[22] Filed: May 29, 1998

[30] Foreign Application Priority Data

May 29, 1997 [JP] Japan ..................... 9-140327

[51] Int. Cl.$^6$ ..................... H02K 49/06
[52] U.S. Cl. ............ 310/103; 310/75 D; 310/89; 310/90; 310/91; 310/101; 310/114; 310/115; 310/118; 310/92; 310/104
[58] Field of Search ............ 310/103, 104, 310/89, 90, 91, 101, 114, 115, 118, 75 D, 92

[56] References Cited

U.S. PATENT DOCUMENTS

| | | | |
|---|---|---|---|
| 2,453,957 | 11/1948 | Allen | 310/103 |
| 3,573,517 | 4/1971 | Osterstrom | 310/103 |
| 3,936,683 | 2/1976 | Walker | 310/103 |
| 4,065,234 | 12/1977 | Yoshiyuki et al. | 417/420 |
| 4,163,164 | 7/1979 | Pieters | 310/103 |
| 4,754,181 | 6/1988 | Mizobuchi et al. | |

FOREIGN PATENT DOCUMENTS

A-4-105376  4/1992  Japan .
A-8-232882  9/1996  Japan .

*Primary Examiner*—Thomas M. Dougherty
*Assistant Examiner*—Thanh Lam
*Attorney, Agent, or Firm*—Harness, Dickey & Pierce, PLC

[57] ABSTRACT

A position of a second permanent magnet with respect to a first permanent magnet is defined by assembling a driving side support member, a thrust bearing, a spacing member, a radial bearing, and a driven side support member. The first and second permanent magnets are respectively held on the driving side support member and the driven side support member. Accordingly, variation of a magnetic gap between the first and second permanent magnets can be reduced. Variations in assembling the parts hardly affect the variation of the magnetic gap.

19 Claims, 2 Drawing Sheets

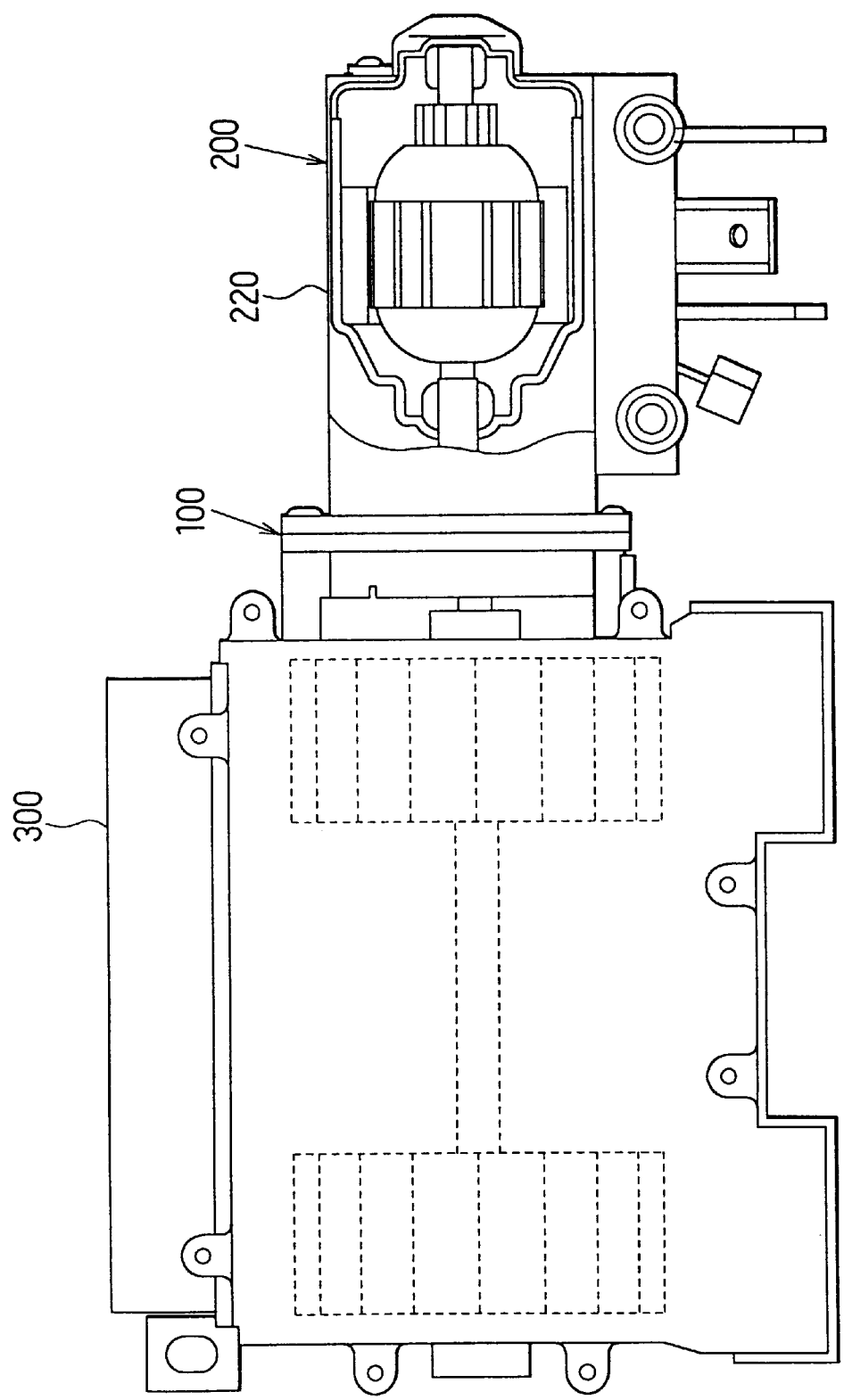

MAGNET COUPLING INCLUDING PERMANENT MAGNETS DISPOSED TO DEFINE MAGNETIC GAP THEREBETWEEN

CROSS REFERENCE TO RELATED APPLICATION

This application is based upon and claims the benefit of priority of the prior Japanese Patent Application No. 9-140327 filed on May 29, 1997, the contents of which are incorporated herein by reference.

BACKGROUND OF THE INVENTION

1. Field of the Invention

The present invention relates to a magnet coupling for transmitting rotating force by magnetic force thereof.

2. Related Arts

A typical magnet coupling shown in FIG. 3 is composed of a pair of disk like permanent magnets 13, 16 disposed between a driving shaft 21 such as a motor shaft and a load side driven shaft 31, and defining a gap $\delta$ (herebelow referred to as a magnetic gap) therebetween.

The magnet coupling transmits rotating force from the driving shaft 21 to the driven shaft 31. At that time, the magnitude of the rotating force is significantly affected by variation in dimension of the magnetic gap $\delta$. Specifically, the rotating force is transmitted from the driving shaft 21 to the driven shaft 31 by attracting force of the magnet coupling, and the magnitude of the rotating force transmitted to the driven shaft 31 is approximately proportional to the magnitude of the attracting force. Therefore, the magnitude of the rotating force transmitted to the driven shaft 31 is inversely proportional to the square of the dimension of the magnetic gap $\delta$.

Because of this, it is necessary for the magnetic gap $\delta$ to be precisely set. This requires sufficiently reducing variations in assembling of parts forming the magnetic couple in addition to sufficiently reducing variations in dimensions of the parts, resulting in increase in manufacturing cost of the magnet coupling. This kind of problem is caused not only to the magnet coupling using the permanent magnets, but to other types of couplings such as an eddy current coupling using an electromagnet.

SUMMARY OF THE INVENTION

The present invention has been made in view of the above-mentioned problem. An object of the present invention is to reduce variation in dimension of a magnetic gap of a magnet coupling. Another object of the present invention is to provide a magnet coupling capable of being manufactured at low cost.

According to the present invention, a magnet coupling has a spacing member disposed between a driving shaft and a driven shaft. The spacing member contacts a driving side bearing rotatably supporting the driving shaft and a driven side bearing rotatably supporting the driven shaft on an opposite side of the driving side bearing. Further, a driving side support member holding a magnetic field generating member (a driving side magnetic member) contacts the driving side bearing on an opposite side of the support member, and a driven member (a driven side magnetic member) connected with the driven shaft is disposed on an opposite side of the driving side bearing with respect to the spacing member to face the magnetic field generating member.

In this case, the driving side bearing can define a gap between the driving side magnetic member and the spacing member, and the driven side bearing can define a gap between the driven side magnetic member and the spacing member. As a result, a magnetic gap between the driving side magnetic member and the driven side magnetic member is readily defined, and variation of the magnetic gap is reduced. When the magnet coupling is assembled, it is not necessary to strictly control the magnetic gap, resulting in low manufacturing cost.

Preferably, the driving side bearing is a thrust bearing, and the driven side bearing is a radial bearing. The spacing member can be made of a non-magnetic material. The driven member can be made of a ferromagnetic material. The ferromagnetic material includes a material which is strongly attracted to a magnetic pole and a material such as a permanent magnet which is polarized to be strongly attracted to a magnetic pole.

The spacing member may have a protruding portion for receiving one of the driving shaft and the driven shaft with a specific clearance. Preferably, the driving side and driven side magnetic members respectively have a ring-shape. In this case, because the one of the driving shaft and the driven shaft which are respectively connected to the driving side and driven side magnetic members is received in the protruding portion of the spacing member with the specific gap, magnetic center lines of the driving side and driven side magnetic members are readily aligned when assembled without a jig. Here, when lines of magnetic force produced by a permanent magnet are symmetrical with respect to a tangent of a line of the magnetic force on a plane including the tangent, the tangent is considered to be a magnetic center line of the permanent magnet.

BRIEF DESCRIPTION OF THE DRAWINGS

These and other objects and features of the present invention will become more readily apparent from a better understanding of a preferred embodiment described below with reference to the following drawings.

FIG. 2 is a schematic view showing the magnet coupling disposed between an electric motor and an explosion proof type blower.

DETAILED DESCRIPTION OF THE PREFERRED EMBODIMENT

Figure 1:
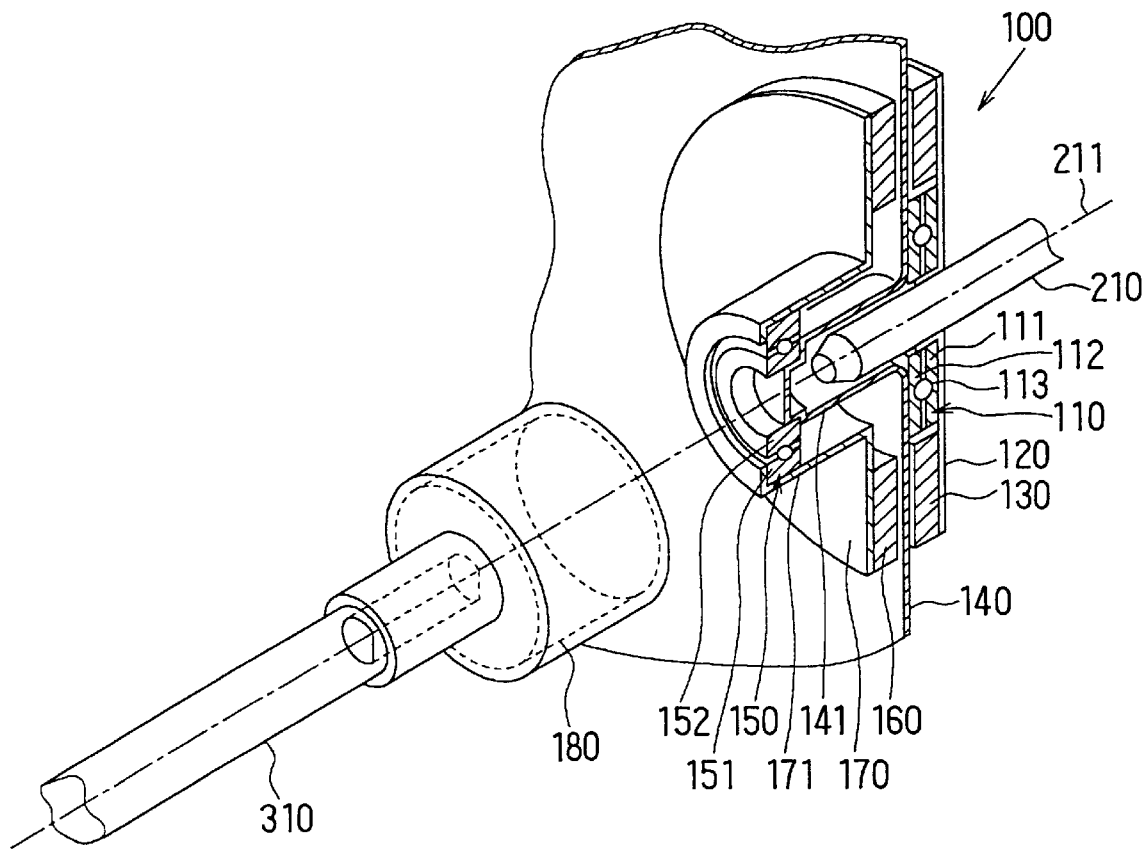
FIG. 1 is a cross-sectional perspective view showing a magnet coupling in a preferred embodiment of the present invention.
Figure 3:
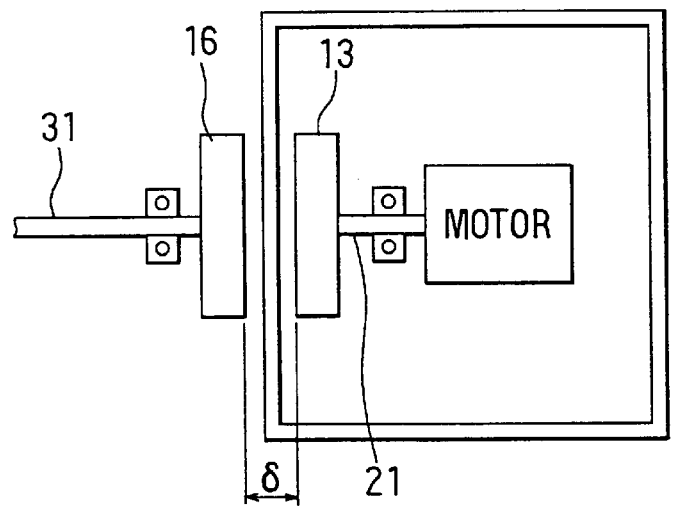
FIG. 3 is a cross-sectional view showing a magnet coupling of a prior art.

In a preferred embodiment according to the present invention, a magnet coupling 100 shown in FIG. 1 is applied to an explosion proof type blower 300 such as a marine blower in order to transmit rotating force of an electric motor 200 to the blower 300 (see FIG. 2). In FIG. 1, reference numeral 310 denotes a fan shaft (driven shaft) of the blower 300, and reference numeral 210 denotes a motor shaft (driving shaft) of the electric motor 200.

The magnet coupling 100 has a thrust bearing 110 composed of first and second races 111, 112, and a rolling member 113. The thrust bearing 110 is connected with the motor shaft 210 in a state where the first race is bonded to a disk like driving side support member 120. Further, a first permanent magnet (magnetic field generating member) 130 is bonded to the support member 120 on an outer radial side of the thrust bearing 110 to be coaxial with the thrust bearing 110 around an axis 211 of the motor shaft 210. The first permanent magnet 130 rotates together with the motor shaft 210 to generate rotating magnetic field around the axis 211.

The support member 120 is made of a ferromagnetic material (thin steel plate in this embodiment). The second race 112 and the rolling element 113 of the thrust bearing 110 are held by the first race 111 with the magnetic force derived from the first permanent magnet 130 and transmitted through the support member 120 and the first race 111.

The second race 112 of the thrust bearing 110 makes contact with a spacing member 140 made of a non-magnetic material such as austenite stainless steel and disposed between the motor shaft 210 and the fan shaft 310. The spacing member 140 covers the electric motor 200 and simultaneously serves as a part of a separator 220 (see FIG. 2) for separating the electric motor 200 from the blower 300. The spacing member 140 has a cylindrical protruding portion 141 formed by pressing for covering the motor shaft 210 on a fan shaft side. A front end of the protruding portion 141 is inserted into an inner race 152 of a radial bearing 150 and is fixed thereto. The front end of the protruding portion 141 is closed so that the motor shaft side and the fan shaft side are completely separated from one another.

The radial bearing 150 composed of the inner race 152 and an outer race 151 rotatably supports a second permanent magnet (driven member) 160 facing the first permanent magnet 130. Specifically, the second permanent magnet 160 is supported by a driven side support member 170 on an opposite side of the first permanent magnet 130 with respect to the spacing member 140 interposed therebetween. The driven side support member 170 has a cylindrical protruding portion 171 for receiving the radial bearing 150 therein and for covering the protruding portion 141 of the spacing member 140 on the fan shaft side. Further, the protruding portion 171 is connected with the fan shaft 310 through a mechanical coupling 180 such as a cylindrical shaft coupling or a box type shaft coupling.

Upon rotating the motor shaft 210 together with the support member 120 and the first permanent magnet 130, the driven side support member 170 and the second permanent magnet 160 rotates to rotate the fan shaft 310 due to attractive force generated between the permanent magnets 130, 160, specifically, due to a component of the attractive force in a rotating direction. Consequently, the rotating force of the motor shaft 210 is transmitted to the fan shaft 310.

Next, processes for assembling the magnet coupling 100 will be described.

First, the first permanent magnet 130 and the first race 111 are bonded to the support member 120, and the second race 112 and the rolling member 113 are disposed on the first race 111 by a driving side assembling process. A member unified in this process is herebelow referred to as a first sub-assembly.

Next, after second permanent magnet 160 is bonded to the driven side support member 170, the radial bearing 150 is inserted into the protruding portion 171 of the driven side support member 170 with force. Then, the protruding portion 141 of the spacing member 140 is inserted into the radial bearing 150 within the protruding portion. A member unified in this process (driven side assembling process) is herebelow referred to as a second sub-assembly.

Next, the motor shaft 210 is inserted into the support member 120 of the first sub-assembly with force, so that the motor shaft 210 and the first sub-assembly are fixed to one another. Then, the motor shaft 210 is inserted into the protruding portion 141 of the spacing member 140 until the thrust bearing 110 contacts the spacing member 140, so that the first sub-assembly is united with the second sub-assembly. Thereafter, the fan shaft 310 is connected with the protruding portion 171 of the driven side support member 170 through the coupling 180.

Next, features and effects in this embodiment will be described.

According to this embodiment, a gap between the second permanent magnet 160 and the spacing member 140 is defined by the thickness of the radial bearing 150 by the driven side assembling process. A gap between the first permanent magnet 130 and the spacing member 140 is defined by the thickness of the thrust bearing 100 by assembling the first and second sub-assemblies. Therefore, variation of a gap between the first and second permanent magnets 130 and 160, i.e., a magnetic gap of the magnet coupling 100 is approximately the sum of variations in dimension of the thrust bearing 110, the radial bearing 150, the spacing member 140, and the first and second permanent magnets 130, 160. Herebelow, these parts are referred to as coupling parts. The variation of the magnetic gap is hardly affected by variations in assembling of the coupling parts. Therefore, the variation of the magnetic gap is easily controlled, resulting in low manufacturing cost of the magnet coupling 100. In addition, the variation of the magnetic gap is decreased.

Generally, the variations in dimension of the thrust bearing 110 and the radial bearing 150 are so small as not to be considered. Therefore, the variation of the magnetic gap is approximately the sum of the variations in dimension of the first and second permanent magnets 130, 160, and the spacing member 140.

In this embodiment, because the first and second permanent magnets 130, 160 respectively have a ring-shape and are disposed around the axis 211 of the motor shaft 210, magnetic center lines of the first and second permanent magnets 130, 160 are parallel to the axis 211. Generally, two permanent magnets are stable in a state where magnetic center lines thereof are collinear to one another. Therefore, when the first sub-assembly holding the motor shaft 210 and the second sub-assembly are united, the first permanent magnet 160 of the second sub-assembly readily moves to a stable position where the magnetic center lines of the first and second permanent magnets 130, 160 are collinear to one another. In this case, it should be noted that an inner diameter of the protruding portion 141 is larger than an outer diameter of the motor shaft 210 so that the motor shaft 210 can be slightly moved in a radial direction of the motor shaft 210 together with the first permanent magnet 130. It is not necessary to use a jig and the like. Then, the axis of the fan shaft 310 is aligned to be collinear to the magnetic center line of the second permanent magnet 160. The axis 211 of the motor shaft 210 is aligned to be collinear to the magnetic center line of the first permanent magnet 13 as well before assembling the first and second sub-assemblies. As a result, in this embodiment, centering between the first and second permanent magnets 130, 160 and between the motor shaft 210 and the fan shaft 310 is easily performed without using the jig and the like.

The shafts 210, 310, and the first and second permanent magnets 130, 160 are mechanically connected with one anther through the bearings 110, 150, and the support members 120, 170. Therefore, the magnetic gap between the first and second permanent magnets 130, 160 can be readily defined. In addition, each magnetic center line of the first and second permanent magnets 130, 160 can be readily aligned to be collinear to each axis of the shafts 210, 310 as compared to that in a non-contact type magnet coupling.

In the above-mentioned embodiment, although the magnet coupling 100 is composed of the two permanent magnets 130, 160, one of the permanent magnets 130, 160 may be replaced with an electromagnetic coil (electromagnet). This type is the so-called eddy-current coupling. The permanent magnets 130, 160 respectively have a ring shape and are disposed on the support members 120, 170; however, a plurality of permanent magnets respectively having a circular shape or a rectangular shape may be arranged on a circumference to cooperatively serve as a permanent magnet having a false ring shape.

In the above-mentioned embodiment, although the magnet coupling 100 of the present invention is applied to the blower 300 to transmit the rotating force from the motor 200 to the blower 300, it is apparent the magnet coupling 100 can be applied to other apparatuses such as an impeller for a water pump. Anti-friction bearings are used for the thrust bearing 110 and the radial bearing 150 in this embodiment; however, a slide bearing made of metal or resin, or an oil impregnation bearing may be used in place of the bearings 110, 150. In the above-mentioned embodiment, the reason why the radial bearing 150 is used as a bearing for rotatably supporting the fan shaft 310 is because a radial load is applied to the fan shaft 310. Therefore, when a thrust load is applied to the fan shaft 310, a thrust bearing is used for the fan shaft 310 in place of the radial bearing 150.

The spacing member 140 has the cylindrical protruding portion 141 and a plate-like portion connected with the protruding portion 141; however it may have only the plate-like portion when the thrust bearing is used for the fan shaft 310. When the spacing member 140 need not serve as a part of the separator 220 or need not cover the electric motor 200, the shape of the spacing member 140 may be simply a cylindrical shape or a plate-like shape.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A magnet coupling for transmitting rotating force from a driving shaft to a driven shaft, comprising:
    a driving side bearing disposed on the driving shaft;
    a magnetic field generating member connected with the driving shaft to generate a rotating magnetic field around the driving shaft in accordance with rotation of the driving shaft;
    a support member holding the magnetic field generating member thereon and contacting the driving side bearing;
    a spacing member made of a non-magnetic material and disposed between the driving shaft and the driven shaft and contacting the driving side bearing on an opposite side of the support member, said spacing member having a protrudng portion for rotatably receiving one of the driving shaft and the driven shaft with a specific clearance;
    a driven side bearing rotatably supporting the driven shaft and contacting the spacing member on an opposite side of the driving side bearing; and
    a driven member made of a ferromagnetic material, the driven member disposed on an opposite side of the driving side bearing with respect to the spacing member and connected with the driven shaft,
    wherein one of the driving side bearing and the driven side bearing is a thrust bearing.

2. The magnet coupling of claim 1, wherein the driving side bearing is the thrust bearing.

3. The magnet coupling of claim 1, wherein the driven side bearing is disposed at a non-mirror image position of the driving side bearing with respect to the spacing member.

4. The magnet coupling of claim 1, wherein one of the driven side bearing and the driving side bearing is an oil impregnation bearing.

5. The magnet coupling of claim 1, wherein:
    the magnetic field generating member and the driven member are permanent magnets respectively having a ring-shape; and
    the magnetic field generating member and the driven member are disposed to generate attracting force therebetween.

6. The magnet coupling of claim 1, wherein:
    the driven side bearing is a radial bearing;
    the spacing member has said protruding portion protruding on a driven shaft side; and
    the driven side bearing is disposed on the protruding portion of the spacing member.

7. The magnet coupling of claim 1, wherein the spacing member separates a driving shaft side from a driven shaft side.

8. A magnet coupling for transmitting rotating force from a driving shaft to a driven shaft, comprising:
    a driving side magnetic member connected with the driving shaft to rotate together with the driving shaft;
    a driven side magnetic member connected with the driven shaft to rotate together with the driven shaft and facing the driving side magnetic member with a specific gap therebetween, the driven side magnetic member rotated by rotation of the driving side magnetic member;
    a driving side support member holding the driving side magnetic member on an opposite side of the driven side magnetic member and fixed to the driving shaft;
    a driven side support member holding the driven side magnetic member on an opposite side of the driving side magnetic member and fixed to the driven shaft;
    a spacing member disposed between the driving side and driven side magnetic members and between the driving and driven shafts and having a protruding portion for rotatably receiving one of the driving shaft and the driven shaft with a specific clearance, the specific clearance being for allowing the one of the driving shaft and the driven shaft to shift in a radial direction thereof;
    a driving side bearing rotatably supporting the driving shaft and contacting the driving side support member and the spacing member between the driving side support member and the spacing member; and
    a driven side bearing rotatably supporting the driven shaft and contacting the driven side support member and the spacing member between the driven side support member and the spacing member.

9. The magnet coupling of claim 8, wherein one of the driving side bearing and the driven side bearing is disposed on the protruding portion of the spacing member.

10. The magnet coupling of claim 8, wherein one of the driving side bearing and the driven side bearing is a thrust bearing, and the other of the driving side bearing and the driven side bearing is a radial bearing.

11. The magnet coupling of claim 8, wherein one of the driving side bearing and the driven side bearing is an oil impregnation bearing.

12. The magnet coupling of claim 8, wherein the driving side and driven side magnetic members respectively have a ring shape.

13. A magnet coupling for transmitting rotating force from a driving shaft to a driven shaft, comprising:

a spacing member made of a non-magnetic material and disposed between the driving shaft and the driven shaft;

a driving side magnetic member connected with the driving shaft to rotate together with the driving shaft and to face the spacing member defining a first gap with the spacing member;

a driven side magnetic member connected with the driven shaft to rotate together with the driven shaft and to face the driving side magnetic member through the spacing member defining a second gap with the spacing member, the driven side magnetic member rotated by rotation of the driving side magnetic member;

a driving side support member holding the driving side magnetic member on an opposite side of the spacing member and fixed to the driving shaft;

a driven side support member holding the driven side magnetic member on an opposite side of the spacing member and fixed to the driven shaft;

a driving side bearing disposed between the spacing member and the driving side support member to define the first gap and rotatably supporting the driving shaft; and a driven side bearing disposed between the spacing member and the driven side support member to define the second gap and rotatably supporting the driven shaft.

14. The magnet coupling of claim 13, wherein the driving side and driven side magnetic members respectively have a ring shape.

15. The magnet coupling of claim 13, wherein one of the driving side bearing and the driven side bearing is a thrust bearing and the other of the driving side bearing and the driven side bearing is a radial bearing.

16. The magnet coupling of claim 13, wherein one of the driving side bearing and the driven side bearing is an oil impregnation bearing.

17. The magnet coupling of claim 13, wherein the spacing member has a protruding portion protruding on a driven shaft side and receiving the driving shaft with a specific clearance, the specific clearance being for allowing the driving shaft and the driving side magnetic member connected with the driving shaft to shift in a radial direction of the driving shaft.

18. The magnet coupling of claim 17, wherein the driven side bearing is disposed on the protruding portion of the spacing member.

19. The magnet coupling of claim 13, wherein:

a thickness of the driving side bearing is the sum of a thickness of the driving side magnetic member and the first gap in an axial direction of the driving shaft; and a thickness of the driven side bearing is the sum of the thickness of the driven side magnetic member and the second gap in an axial direction of the driven shaft.

* * * * *